United States Patent
Sinopoli et al.

(10) Patent No.: US 6,817,395 B2
(45) Date of Patent: Nov. 16, 2004

(54) CROWN REINFORCEMENT FOR HEAVY DUTY TIRES

(75) Inventors: Italo Marziale Sinopoli, Canton, OH (US); Charles Elmer Hamiel, Stow, OH (US); Barry Allen Matrana, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 75 days.

(21) Appl. No.: 10/208,398

(22) Filed: Jul. 30, 2002

(65) Prior Publication Data

US 2004/0020578 A1 Feb. 5, 2004

(51) Int. Cl.⁷ .............................. B60C 9/20; B60C 9/00; C07B 1/06
(52) U.S. Cl. .......................... 152/527; 57/218; 57/902; 152/451
(58) Field of Search ................... 152/451, 527; 57/902, 218

(56) References Cited

U.S. PATENT DOCUMENTS

| | | |
|---|---|---|
| 3,538,702 A | 11/1970 | Wolf et al. |
| 3,762,145 A | 10/1973 | Kikuchi et al. |
| 3,825,052 A * | 7/1974 | Matsuyama et al. |
| 3,834,149 A | 9/1974 | Niabet |
| 3,911,662 A | 10/1975 | Fenner |
| 4,158,946 A | 6/1979 | Bourgois |
| 4,506,500 A | 3/1985 | Miyauchi et al. |
| 4,586,324 A | 5/1986 | Mizuma |
| 4,715,419 A | 12/1987 | Kawasaki et al. |
| 4,781,016 A | 11/1988 | Sato et al. |
| 4,947,638 A | 8/1990 | Nagamine et al. |
| 5,261,474 A | 11/1993 | Lobb et al. |
| 5,318,643 A | 6/1994 | Mizner et al. |
| 5,321,941 A | 6/1994 | Bollen et al. |
| 5,323,595 A | 6/1994 | Mizuta et al. |
| 5,551,498 A | 9/1996 | Komatsuki |
| 5,688,344 A * | 11/1997 | Kobayashi et al. ......... 152/527 |
| 6,041,839 A | 3/2000 | Susutoglu |
| 6,272,830 B1 * | 8/2001 | Morgan et al. ......... 152/451 X |
| 6,273,160 B1 | 8/2001 | Helfer et al. |
| 2002/0053386 A1 | 5/2002 | Hirachi et al. |

FOREIGN PATENT DOCUMENTS

| | | | |
|---|---|---|---|
| EP | 0553391 | | 8/1993 |
| JP | 08109585 A | * | 4/1996 |
| JP | 08158276 A | * | 6/1996 |
| JP | 08176981 A | * | 7/1996 |
| JP | 08284078 A | * | 10/1996 |
| JP | 11021774 A | * | 1/1999 |
| JP | 11043877 A | * | 2/1999 |
| JP | 2001020188 A | * | 1/2001 |

* cited by examiner

Primary Examiner—Adrienne C. Johnstone
(74) Attorney, Agent, or Firm—June E. Rickey; David L. King

(57) ABSTRACT

A pneumatic radial ply tire 20 has a tread 24, a carcass 21, and a belt reinforcing structure 40. The carcass 21 has a steel cord reinforced radial ply extending from one annular bead to a second annular bead. The belt reinforcing structure 40 has at least two belt layers 40A, 40B having steel cords 14 with large filaments 17A, 17B, 17C, 17D in the range of 0.3 mm to 0.6 mm in diameter twisted into a 7×7 cord construction.

5 Claims, 3 Drawing Sheets

CROWN REINFORCEMENT FOR HEAVY DUTY TIRES

TECHNICAL FIELD

This invention relates to a belt reinforcing structure for heavy duty tires, more specifically for off-road tires commonly referred to as earthmover tires.

BACKGROUND OF THE INVENTION

The large off-road pneumatic tires used in heavy construction and earthmoving operations have operating loads and inflation pressures much higher than conventional trucks and lightweight vehicles.

The radial ply earthmover tires exhibit tremendous load-carrying capacity. The very thick rubber tread and the massive amount of rubber in the sidewalls contribute to high heat generated tire issues.

The use of a large steel cord in the carcass ply in combination with steel cords in the belt structure has been a common practice. Tire manufacturers employ a variety of constructions for optimizing the tires' durability.

A primary concern for the performance of the tire is insuring adequate rubber penetration into the cords is achieved during the manufacture of the belt layers and in subsequent tire vulcanization. Coupled to this better rubber flow is a desire for higher steel mass and improved wire cut resistance to improve the tires' overall durability.

The prior art belt constructions for such tires have employed steel cords having many filaments of fine or small diameters. A typical construction would have four or more working belt layers and a pair of high elongation wire reinforced layers for the outermost layers located between the tread and the working belts. These tires would have filaments having diameters between 0.15 and 0.265 mm.

One such tire, a 36.00 R51 earthmover tire, employed a wire construction of 7×7×0.25+1 mm featuring a wrap ("+1") to stabilize the construction with an overall unwrapped cord diameter of 2.25 mm. Alternatively, a 5/8/14×0.265+1 super tensile steel wire construction was used with an overall unwrapped cord diameter of 1.6 mm. These very fine diameter filament constructions are very closely packed making it much more difficult for rubber to penetrate into the interior of the cords. As a result the filaments are more susceptible to cutting and frictional wear, particularly with such small diameter filaments.

The present invention uses multiple filament diameters in a 7×7 cord design to increase the filament spacings in the cord, which allows better rubber penetration for improved resistance to corrosion as well as superior cut resistance. The fracture fatigue common in such large filaments is compensated for by the unique construction of the cord that takes advantage of large internal spaces to allow for maximum rubber coating to protect and cushion the filaments against filament-to-filament frictional wear. In addition, the 7×7 cord of the present invention was designed to be stable without the use of a wrap wire. Thus, the wrapless 7×7 construction eliminated the significant wear mechanism between the wrap and the outer filaments of the construction.

SUMMARY OF THE INVENTION

A pneumatic radial ply tire has a tread, a carcass, and a belt reinforcing structure. The carcass has a steel cord reinforced radial ply extending from one annular bead to a second annular bead. The belt reinforcing structure lies radially between the tread and the carcass.

The belt reinforcing structure has at least two steel cord reinforced belt layers, two of the belt layers have steel cords having large filaments in the range of 0.3 mm to 0.6 mm in diameter twisted into a seven by seven cord construction. The cords are oriented parallel to each other within the belt layer. Each belt layer has cords directionally oppositely inclined relative to the adjacent belt layer.

The at least two steel cord reinforced belt layers have cords having an overall unwrapped diameter D of 3.0 mm to 4.0 mm.

In one embodiment of the invention at least one of the at least two steel cord reinforced belt layers has a cord construction 1×(0.40+6×0.365)+6×(0.365+6×35); preferably four belt layers employ this cord construction.

In another embodiment the belt reinforcing structure has two belt layers have a cord construction of 1×(0.40+6×0.365)+6×(0.365+6×0.35) and two belt layers with a cord construction of 7×(3+9+15×0.245)+1 HT.

In both these tire constructions it is optionally recommended that an overlay of two layers reinforced by high elongation (HE) wire be employed between the belt layers and the tread. A cord of 4×6×0.265 (HE) can be used for such an overlay as one example.

Definitions

"Aspect ratio" of the tire means the ratio of its section height (SH) to its section width (SW);

"Axial" and "axially" mean lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Carcass" means the tire structure apart from the belt structure, tread, undertread, and sidewall rubber over the plies, but including the beads;

"Circumferential" means lines or directions extending along the perimeter of the surface of the annular tread perpendicular to the axial direction;

"Chafers" refers to narrow strips of material placed around the outside of the bead to protect cord plies from the rim, distribute flexing above the rim, and to seal the tire;

"Chippers" mean a reinforcement structure located in the bead portion of the tire;

"Cord" means one of the reinforcement strands of which the plies in the tire are comprised;

"Equatorial plane (EP)" means the plane perpendicular to the tire's axis of rotation and passing through the center of its tread;

"Footprint" means the contact patch or area of contact of the tire tread with a flat surface at zero speed and under normal load and pressure;

"Innerliner" means the layer or layers of elastomer or other material that form the inside surface of a tubeless tire and that contain the inflating fluid within the tire;

"Net-to-gross ratio" means the ratio of the tire tread rubber that makes contact with the road surface while in the footprint, divided by the area of the tread in the footprint, including non-contacting portions such as grooves;

"Nominal rim diameter" means the average diameter of the rim flange at the location where the bead portion of the tire seats;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Ply" means a continuous layer of rubber-coated parallel cords;

"Radial" and "radially" means directions radially toward or away from the axis of rotation of the tire;

"Radial-ply tire" means a belted or circumferentially-restricted pneumatic tire in which the ply cords which extend from bead to bead are laid at cord angles between 65° and 90° with respect to the equatorial plane of the tire;

"Section height" (SH) means the radial distance from the nominal rim diameter to the outer diameter of the tire at its equatorial plane.

DETAILED DESCRIPTION OF THE DRAWINGS

The invention will be described by way of example and with reference to the accompanying drawings in which.

DETAILED DESCRIPTION OF THE INVENTION

Figure 1:
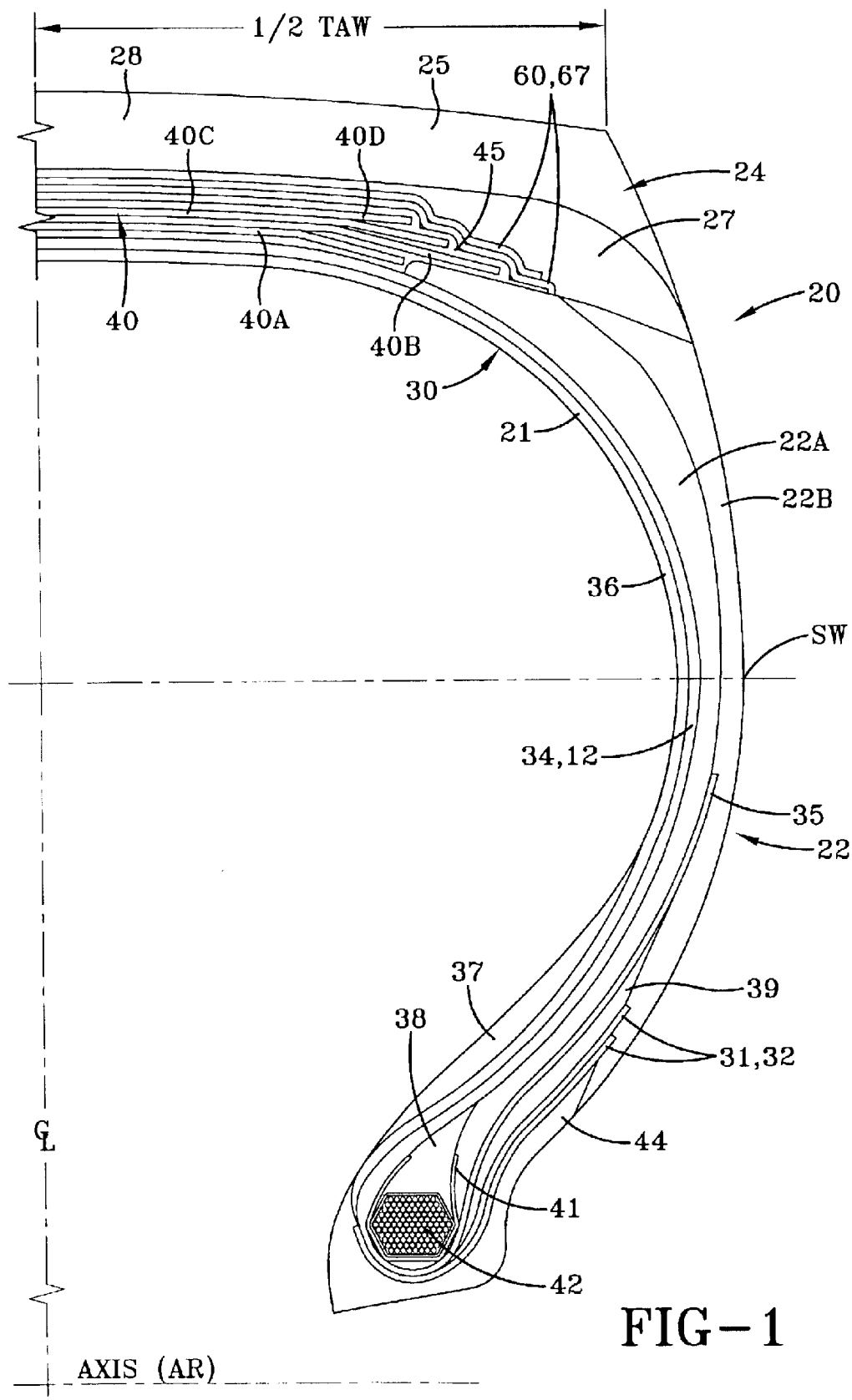
FIG. 1 is a cross sectional view of one side or half of a symmetrical tire made in accordance with the present invention.
Figure 1A:
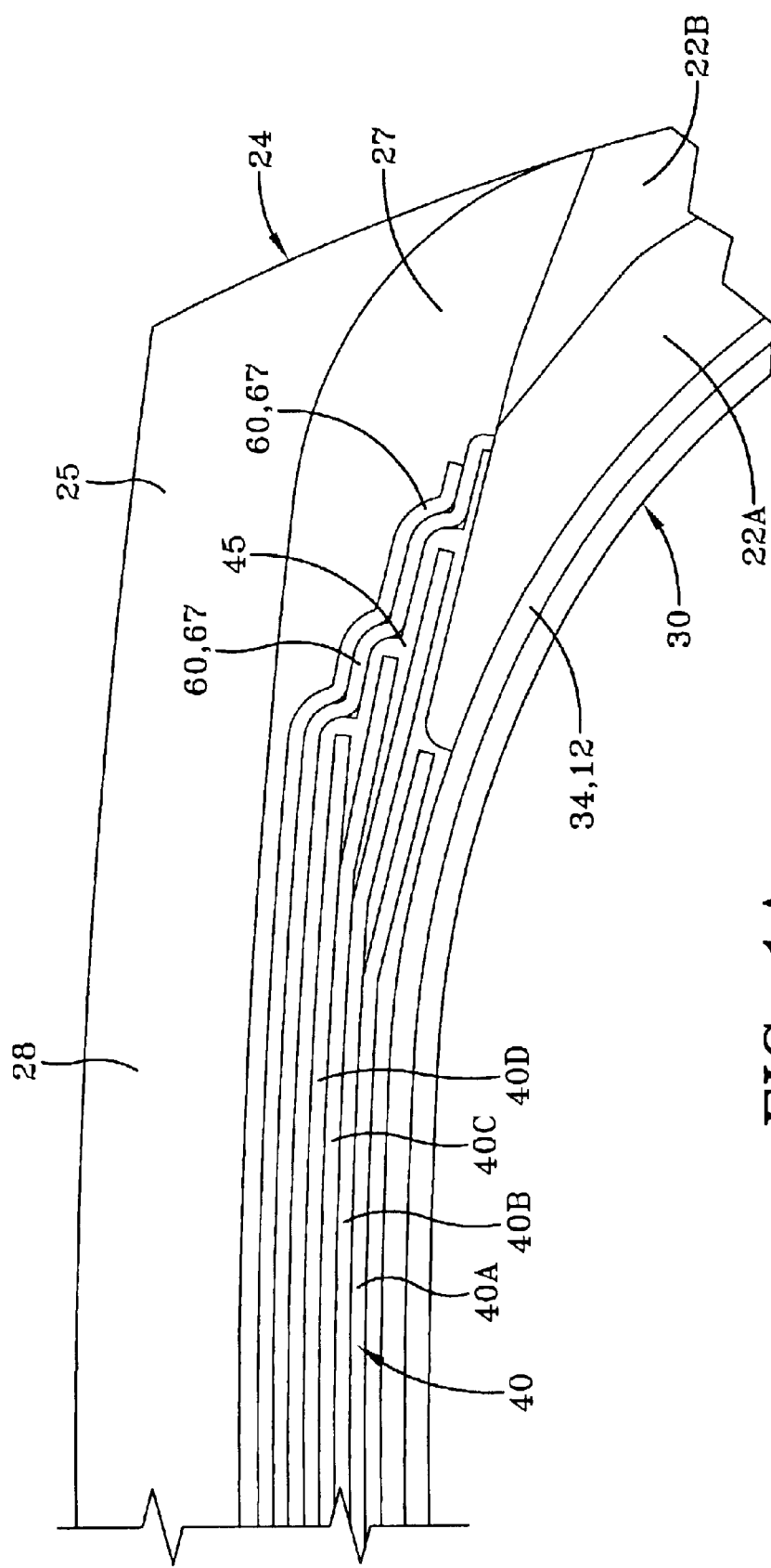
FIG. 1A is an enlarged view of the belt reinforcing structure.
Figure 2:
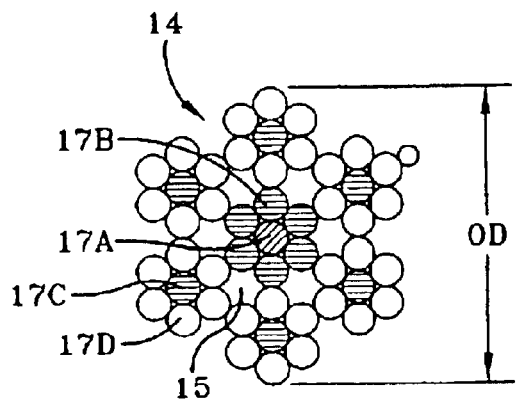
FIG. 2 is an enlarged cross sectional view of the steel belt cord of the present invention.

With reference to FIG. 1, a cross sectional view of a preferred embodiment of the improved earthmover tire having the shape and construction according to the present invention is illustrated. FIG. 2 shows tire 20 according to the present invention. Larger tires would be similar in construction appearance, but may have additional belts and chippers.

The preferred embodiment earthmover tire 20 has a tread 24. The tread includes a plurality of lugs 25. The lugs 25 have a ground contacting surface 28 at the radially outermost surface of the lugs. The ground contacting surface 28 has an area in the range of 40% to 60% of the overall tread area, the area relationship is commonly referred to as the net-to-gross ratio. The tread 24 has a radially inner portion defined as an undertread 27. The tire 20 has a casing 30 inward of the tread 24. The casing 30 has a carcass 21 and a belt reinforcing structure 40 having a plurality of at least four steel reinforced belts 40A, 40B, 40C and 40D radially inward and adjacent to the undertread 27. The axially outer ends of the belts 40A, 40B, 40C and 40D are covered by a gum strip 45. Radially inward of the belts is disposed a single steel cord reinforced ply 34 having a pair of turn up ends 35 which are each wrapped about an elastomeric gum strip commonly called a flipper 41 and a steel cabled hexagonal shaped bead 42. Radially inward of the ply 34 is an air impermeable inner liner 36. Adjacent to the inner liner is an elastomeric ply line insert 37. Radially above each bead is an elastomeric apex 38. Between the ply turn up 35 and a pair of chippers 31, 32 is inserted an elastomeric wedge 39. Radially inward and axially outward of each of the beads 42 is a hard elastomeric component commonly called a chaffer 44. Disposed between the tread 24 and the beads 42 are a pair of sidewalls 22. The sidewalls 22 include an axially inner portion 22A disposed radially inward of and axially under the belt edges and between the ply 34 and the ply turn up 35, and an axially outer sidewall portion 22B disposed axially outward of the inner sidewall and outward and adjacent to the ply turn up end 35.

In the size illustrated, the preferred embodiment features two chippers 31, 32, which may be composed of rubber with nylon or steel reinforcement. The single ply 34 is reinforced with steel and features a turn up ending 35 below the radial locating maximum section width SW of the preferred embodiment tire 20. The turn-up end 35 may end 35 higher or lower than that shown in FIG. 1, but should parallel the ply line curve through most of the radially lower sidewall.

FIG. 1 shows the ply line insert 37 which is employed in the preferred embodiment. It may be located interior to the tire innerliner 36 as shown in the drawing or between the liner 36 and the ply line 34.

Figure 4:
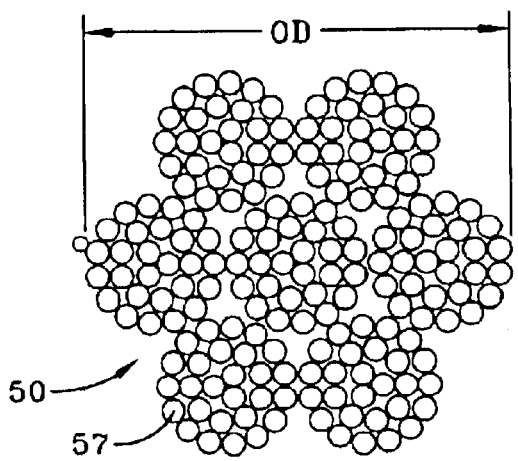
FIG. 4 is an enlarged cross sectional view of another cord construction for the belt layers to be used in a second embodiment of the present invention.

The preferred embodiment features a single steel ply 34 with 0 to 4 chippers 31, 32, but may have as many as six chippers for very large sizes. The cord 12 of the ply 34 has a construction 7×(3×9+15×0.245)+1 HT with a cross sectional area of 8.91 mm$^2$. The cord 12 is as shown in FIG. 4 and is used in a belt construction of an alternative embodiment reinforcing belt structure 40.

The belt structure 40 as illustrated employs at least four belt layers 40A, 40B, 40C and 40D and optionally may include one or more, preferably 2, overlay layers of high elongation steel. The overlay layers 60 provide additional cut and penetration protection for the underlying belt structure 40. The cords 67 of the overlay layers 60 have a 4×6×0.265 high elongation high tensile steel construction in the exemplary 57" tire size.

The prior art earthmover tire in a 40.00R/57 inch tire size employed a 7×(3+9×0.245)+1 HT cord in belt layers 40A and 40B and a 7×(3+9+15×0.175)+1 HT cord 8 in belt layers 40C and 40D. This tire belt structure had a steel cord cross sectional area of 3.96 mm$^2$ cord belts 40A and 40B and 4.55 mm$^2$/cord in belts 40C and 40D. Each layer 40A, 40B, 40C and 40D had the ends per inch at 5.5 epi.

The present invention uses wire constructions with much larger filaments 17A, 17B, 17C and 17D having diameters of 0.3 mm or greater. In the tire 20 illustrated in FIG. 1 the cord construction was (0.40+6×0.365)+6×(0.365+6×0.35) ST. As illustrated, the filament 17A is 0.4 mm, filaments 17B and 17C are 0.365 mm, and filament 17D is 0.35 mm, respectively. This cord 14 has a steel cross-sectional area of 4.84 mm$^2$ and is very open in terms of cross sectional void area between the filaments. Assuming one measures the overall diameter across the filaments 17A, 17B, 17C and 17D shown in FIG. 2, then the OD would be 0.4+(4×0.365)+(4×0.35) which is 3.26 mm; the overall cross sectional area would be 8.35 mm$^2$. The void area based on the overall area minus the steel cross sectional area would be 8.35−4.84 or 3.51 mm$^2$. The void area calculation shows that about 42% of the area within the circular cross-section is available for rubber penetration.

Figure 3A:
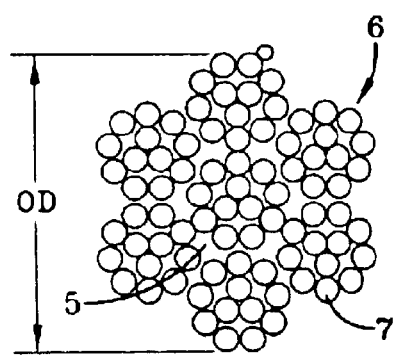
FIGS. 3A and 3B are enlarged cross sectional views of prior art steel cords.

The prior art cord having 7×(3×9×0.245) has an overall OD of about 3.1 mm extending across twelve filaments 7 and the overall area of 7.55 mm$^2$ yielding a void area of 3.59 mm$^2$. This is also 48% of the total area. When one considers the cord's shape as shown in FIG. 2 as compared to the prior art cords of FIGS. 3A and 3B, it can easily be appreciated that most of the rubber penetration of the prior art cords 6 and 8 occurs on the outer periphery due to the very close spacing of the wire filaments 7, 9 of FIGS. 3A and 3B while very little of the rubber penetration can reach the internal void areas 5. Alternatively, in FIG. 2 about half of the void area 15 is found in the interior portion of the cords 14 and most of this area is easily coated in rubber.

Figure 3B:
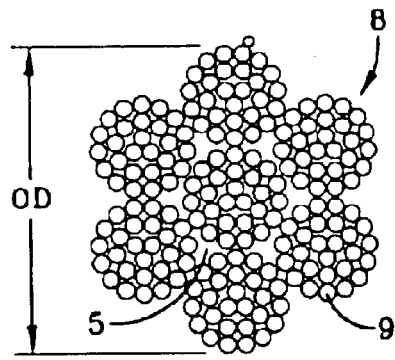

In FIG. 3B, the overall diameter of the cord 8 extends across about 18 of the 0.175 mm filaments 9. This yields an OD of about 3.15 mm and an overall area of 7.8 mm$^2$. The resultant available void area can be calculated to be 7.8 mm$^2$ minus 4.55 mm$^2$ or 3.25 mm$^2$ yielding a void ratio of 42% as previously shown for the cord 17 of the present invention. However, as discussed, the use of a single filament diameter and a 3-layer (3+9+15) strand construction in cord 8 results in a more compact cord and less rubber penetration into the core compared to the 2-layer (1+6), multiple filament diameter cord 17 of the present invention.

Thus, it is apparent that the larger filaments 17A, 17B, 17C and 17D employed in the present invention are coated in more rubber and being larger in diameter are much less prone to being cut sensitive.

Each of the cord constructions shown in FIGS. 2, 3A, 3B and 4 has a wrap wire 4 shown. This wrap wire is optional for the 7×7 cords 14 shown in FIG. 2.

It is this very ability to provide an increase in steel mass while also improving rubber penetration into the cords that helps improve the tires' belt durability.

With reference to FIG. 4 an alternative cord 50 having a 7×(3+9+15×0.245 mm)+1 HT is shown. In one alternative embodiment tire the belt layers 40C and 40D use this cord 50 in place of the cord 14. The filaments 57 of cord 50 are small but the overall steel mass is 8.91 mm$^2$ as measured by the cross sectional area of the filaments 57. When the cord 50 is used in combination with at least two belt layers 40A and 40B having the inventive cord 14 a substantial increase in breaking strength is achieved. This combination is desirable in the very large earthmover type tires.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic radial ply tire has a tread, a carcass, the carcass having a steel cord reinforced radial ply extending from one annular bead to a second annular bead and a belt reinforcing structure lying radially between the tread and the carcass, the belt reinforcing structure comprising:

at least two steel cord reinforced belt layers, each belt layer having steel cords having large filaments in the range of 0.3 mm to 0.6 mm in diameter twisted in a seven by seven cord construction, the cords being oriented parallel to each other within the belt layer, each belt layer having cords oppositely inclined relative to the adjacent belt layer, wherein at least one of the at least two steel cord reinforced belt layers has a cord construction of 1×(0.40+6×0.365)+6×(0.365+6×0.35).

2. The pneumatic radial ply tire of claim 1 wherein the belt reinforcing structure has four belt layers having the cord construction of 1×(0.40+6×0.365)+6×(0.365+6×0.35).

3. The pneumatic radial ply tire of claim 1 where the belt reinforcing structure has two belt layers with a cord construction of 1×(0.40+6×0.365)+6×(0.365+6×0.35) and two belt layers with a cord construction of 7×(3+9+15×0.245)+1 HT.

4. The pneumatic tire of claim 1 which has two radially outer, overlay layers reinforced by high elongation wire.

5. The pneumatic tire of claim 4 wherein the two radially outer overlay belts have cord constructions of 4×6×0.265 HE.

* * * * *